United States Patent [19]

Uchida et al.

[11] Patent Number: 4,877,475
[45] Date of Patent: Oct. 31, 1989

[54] METHOD FOR PRODUCING INFORMATION STORAGE DISK

[75] Inventors: Masami Uchida, Hirakata; Seiko Minamide, Nara, both of Japan

[73] Assignee: Matsushita Electric Industrial Co., Ltd., Kadoma, Japan

[21] Appl. No.: 135,539

[22] Filed: Dec. 18, 1987

Related U.S. Application Data

[62] Division of Ser. No. 856,286, Apr. 28, 1986, abandoned.

[30] Foreign Application Priority Data

Nov. 1, 1984 [JP] Japan ............................ 59-230704
Dec. 11, 1984 [JP] Japan ............................ 59-261141
Dec. 11, 1984 [JP] Japan ............................ 59-261142

[51] Int. Cl.⁴ ........................................... B32B 31/28
[52] U.S. Cl. ............................. 156/273.7; 156/275.7; 156/295; 427/54.1; 427/231; 427/240
[58] Field of Search ................. 118/50, 52, 55, 63, 118/641; 156/272.2, 69, 272.8, 273.5, 274.6, 273.7, 275.1, 275.3, 275.5, 275.7, 285–286, 379:6, 379.8, 380.9, 578, 305, 307.1, 307.3, 295; 427/54.1, 55, , 127, 130, 207.1, 208.2, 231, 232, 235, 240

[56] References Cited

U.S. PATENT DOCUMENTS

| | | | |
|---|---|---|---|
| 2,632,725 | 3/1953 | Marks | 118/52 |
| 3,217,088 | 11/1965 | Steierman | 156/272.2 |
| 3,968,972 | 7/1976 | Morgan | 279/2 R |
| 4,227,347 | 10/1980 | Tam | 118/52 |
| 4,549,922 | 10/1985 | Oishi | 156/303.1 |
| 4,611,553 | 9/1986 | Iwata | 118/50 |

Primary Examiner—Merrell C. Cashion, Jr.
Attorney, Agent, or Firm—Cushman, Darby & Cushman

[57] ABSTRACT

Bonding of a protection sheet on the substrate of the information storing disk is made by revolving the substrate and the protection film with viscous adhesive applied therebetween, to spread it by centrifugal force, and, after slowing down the rotation speed, UV light is irradiated through the protection film to harden the adhesive.

8 Claims, 5 Drawing Sheets

METHOD FOR PRODUCING INFORMATION STORAGE DISK

This is a division of application Ser. No. 856,286 filed Apr. 28, 1986 which was abandoned upon the filing hereof.

FIELD OF THE INVENTION AND RELATED ART STATEMENT

1. FIELD OF THE INVENTION

The present invention relates generally to method for producing an information storage disk, and particularly suitable for method for producing an optical information storage disk.

2. DESCRIPTION OF THE RELATED ART

Hitherto, a conventional recordable optical disk or pre-recorded play-only video disk has been produced by bonding on a transparent disk-shaped substrate a non-recorded image-storing medium film or pre-recorded image storing film having pits disposed along tracks and covered with a reflection film, wherein the image storing film is bonded on the substrate by adhesive, and further thereon a protection sheet is bonded.

The above-mentioned image storing disk having such a construction as bonding the protection sheet on the substrate by adhesive has such a problem in mass production as follows:

(1) The adhesive used for bonding creeps out on the peripheral edge of the disk or edge of the center hole, and contaminates the surface of the disk, or to avoid the above, a subsequent cleaning procedure is needed, (2) The layer of adhesive between the substrate and the information storage film must be accurately uniform in thickness and completely free of inclusions of bubbles or dust, (3) The bonding procedure has to be free of curling of the disk after hardening of adhesive and the bonding must be so accurate that there is no undesirable shifting between the substrate and the bonded film.

In order to dissolve the above-mentioned problem, the conventional method requires many steps in production which leads to increase of manufacturing cost and insufficient production yield.

The method of the conventional making of the information storage disk is elucidated with reference to FIG. 2, FIG. 3 and FIG. 4. FIG. 1 is a sectional view showing general structure of the conventional optical information storage disk, FIG. 2 is an enlarged sectional view showing a part of FIG. 1.

As shown in FIG. 1 and FIG. 2, a recording medium film 3 having track grooves 2 is formed on a substrate 1 of transparent plastic disk 1, and a transparent protection sheet 4 is bonded by an adhesive film 5 on the recording medium film 3. The disk has a center hole formed by making accurate registration of the center hole 6 of the substrate 1 and a center hole 7 of the protection sheet 4. The center hole 6 serves to define revolution center of the disk. In case the information storage disk is a pre-recorded play-only disk, the track groove 2 has many pits and the recording medium film 3 becomes a reflection layer for incident light 8.

In the construction shown in FIG. 1 and FIG. 2, a play back of recorded information is made by irradiating a laser light beam B onto the pits of the track groove 2, thereby to make light reflect 8b from the recording medium film 3. The recording medium film 3 usually is made from a thin film comprising Te as principal component, and the thin film 3 of Te is semi-transparent because of being a very thin film. Since the recording medium 3 is semi-transparent, if there is a foam 9 in the adhesive layer 5 used for bonding the protection sheet 4, the portion 8a of the laser light 8, which passes through the recording medium film 3 and ordinarily travels into the protection film 4 and is absorbed therein, is reflected by the foam 9. Thereby the reflected light produces undesirably reflected light 8b. The light reflected by the foam 9 makes noise. Accordingly, the adhesive film 5 must be formed very uniform in thickness and without any foam or dust.

Furthermore, since the adhesive film must be provided on all the surface of the disks 1, excessive portions of the adhesive which come out to the peripheral edge part and to the edge part of the central hole have to be cleaned, so as not to make stains on the surface of the optical information disk and to assure accuracy of the inner diameter of the center hole.

In the conventional manufacturing process shown in FIG. 3, a lower holder 10 on which the disk substrate 1 is held is designed to have a little smaller diameter in comparison with the diameter of the disk. The lower holder 10 is fixed on a lower table 11. An upper holder 12 is similarly fixed to an upper table 13, and the upper table is to be put on a spacer 14 provided on the lower table 11, so that the disk thickness is defined by the height of the spacer 14. A center boss 16 having vertical slots 16 on outside face is provided in order to assure accurate registration of the substrate 1 and the protection sheet 4, and the vertical slots serves to receive excessive adhesive which is squeezed out at the edge face of the center hole.

In the manufacturing apparatus of FIG. 3, way of bonding the protection sheet 4 on the substrate 1 with the recording medium film is elucidated. First, a substrate 1, on which the recording medium film 3 is already formed, is put on the lower holder 10 with the recording medium film 3 upside. And, by inserting the center boss 15 in the hole of the substrate 1 the centering of the substrate 1 is obtainable. Next, after applying an adhesive, for instance, BV-polymerization type adhesive on the substrate 1 in a ring shaped part, which is cocentrical to the axis and at a part of medium diameter of the disk, the protection sheet 4 is put on the substrate 1 by utilizing the center boss 15 as a centering means. Then, by putting the upper table 13 having the upper holder 12 thereunder on the protection sheet 4, the protection sheet 4 is pressed onto the substrate 1 with the adhesive 3 in between. At that time, the height of the spacer 14 defines the thickness of the composite disk consisting of the substrate 1 and the protection sheet 4. Then, by the pressing of the protection sheet toward the substrate 1, the adhesive 3 is pressed to spread on all the surface of the substrate 1. After removing the upper table 13 and the upper holder 12, the adhesive layer is subject to an exposure by UV-light through the protection sheet 4, and hence is hardened thereby to firmly bond the protection sheet 4 on the substrate 1. In the above-mentioned bonding, when the amount of the adhesive is not sufficient the bonding becomes incomplete, and hence the adhesive is usually applied sufficiently. As a result the excessive adhesive comes out of the peripheral edge part 18 and to the hole edge part 17. In this conventional method, though the vertical slots 16 are provided the discharge adhesive tends to stick on the surface side or rear side of the bonded disk. Accordingly, the conventional method necessitates removing or cleaning of such adhesive sticking on the surface and the rear face of the disk as well as the edge parts. If the adhesive sticking on the surface or the rear face is hardened as it is, there is such a trouble that the substrate is bonded to the lower holder 10 or the upper holder 12. The adhesive sticking on the surfaces of the lower holder 10 or the upper holder 12 has to be removed, too. With respect to the adhesive which comes out to the outer peripheral edge part 18, though such adhesive does not stick to the force of the lower holder 10 or the upper holder 12, three is a possibility that the coming out adhesive at the peripheral edge parts is sometimes such due to non-uniformity of thickness of the substrate 1 or the protection sheet 4, and sticks on the lower holder 10.

Even in case the coming out adhesive does not stick on the faces of the lower holder 10 or the upper holder 12, still there is a necessity of a finishing step to remove the adhesive coming out to the peripheral edge or edge of the central hole.

The above-mentioned problem has been an obstacle of improvement in production yield of the information storage disk of that type, and an improvement to solve the above-mentioned problem has been demanded.

SUMMARY OF THE INVENTION

The present invention purposes to provide an improved method for efficiently manufacturing an information storage disk, whereby the step of manually removing excessive adhesive after the bonding of the protection sheet onto the substrate can be eliminated, and further undesirable sticking of excessive adhesive on the surface or the edges of the information storage disk is eliminated.

The method in accordance with the present invention comprises the steps of:

applying viscous adhesive on a first disk having a center hole, at a part near the center hole, placing a second disk having a center hole corresponding to the center hole of the first disk on the first disk, to form a laminated disk, mounting the laminated disks on rotating means, inserting a center boss of the rotating means in the center holes, revolving the laminated disk around an axis of the center boss by said rotating means to spread the viscous adhesive to all parts of the contacting faces, and hardening the adhesive in the state of mounting the laminated disks on the center boss.

The method can make forming of uniform and smooth adhesive layer between the substrate and the protection sheet by use of rotation of the substrate and the protection sheet, without making undesirable creeping of excessive adhesive to the edge parts of the center hole and peripheral part or further to the surfaces of the disk.

DESCRIPTION OF THE PREFERRED EMBODIMENTS

Figure 1:
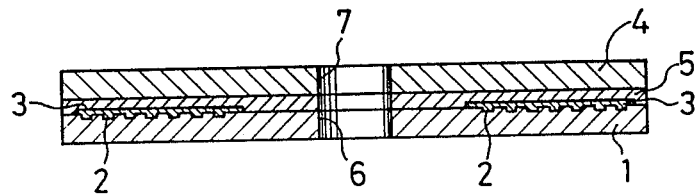
FIG. 1 is the sectional view showing the conventional general optical disk.
Figure 2:
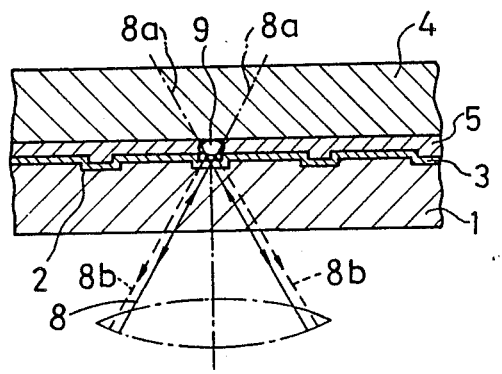
FIG. 2 is the enlarged sectional view showing the one part of FIG. 1 in the enlarged size.
Figure 3:
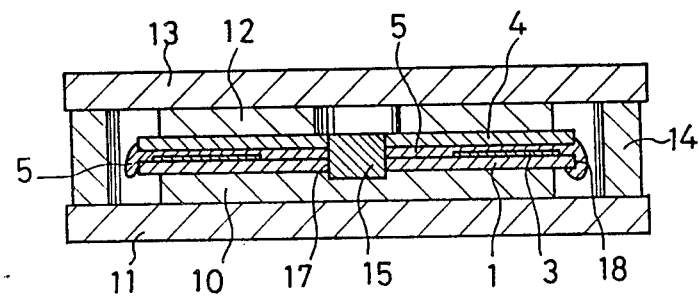
FIG. 3 is the sectional view showing the conventional apparatus for manufacturing the information storage disk.
Figure 4:
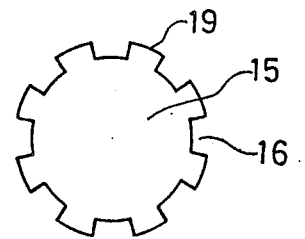
FIG. 4 is the plan view showing center boss of the conventional apparatus of FIG. 3.
Figure 5:
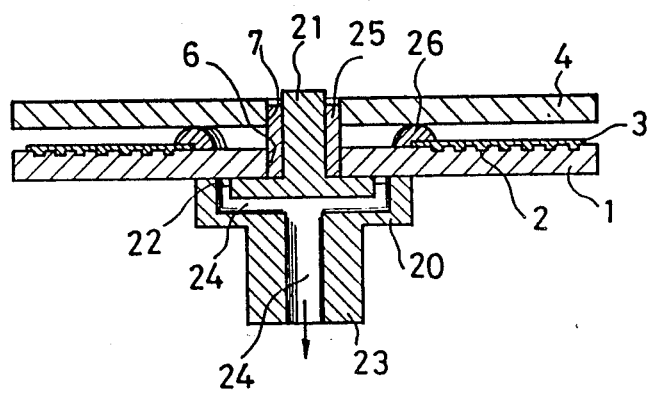
FIG. 5, FIG. 6 and FIG. 7 show one preferred example of manufacturing process and apparatus for making an information storage disk in accordance with the present invention.
Figure 6:
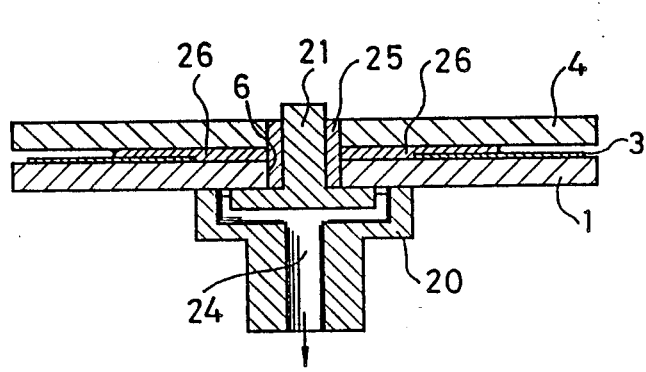
Figure 7:
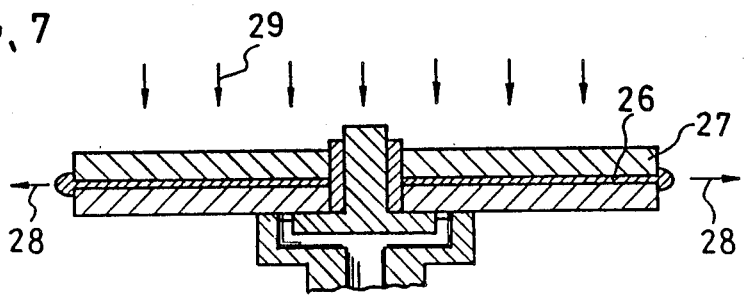
Figure 8:
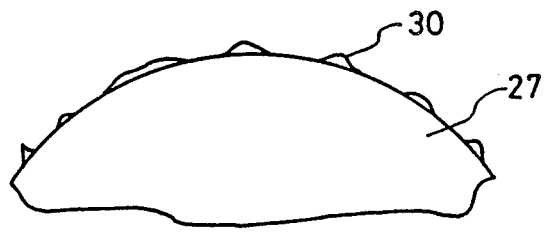
FIG. 8 is a plan view showing resultant disk made in the apparatus shown in FIG. 5 to FIG. 7.

Hereafter preferred embodiments are described with reference to the accompanied drawings. FIG. 5 to FIG. 7 show method for manufacturing information storage disks an apparatus embodying the present invention, wherein FIG. 5 is a sectional view showing a state of laminating a substrate 1 and a protection sheet 4, FIG. 6 is a sectional view showing a state wherein adhesive 26 partly spreads from the state of FIG. 5, and FIG. 7 is a sectional view showing a state wherein the adhesive 26 has spread all the interface between the substrate 1 and the protection sheet 4.

As shown in FIGS. 5–7, a substrate 1, which is usually a transparent plastic sheet has track grooves 2 on its face, whereon a recording medium such as Te-compound thin film is formed, is disposed on a rotary holder 20. The rotary holder 20 has a shaft 21 on its axis, and a center boss 25 is mounted on the shaft 21 in coaxial relation thereto. The rotary holder 20 has a circular groove 22 on its top face and a draft path 24 is provided connected to the circular groove 22.

A preferred method for bonding the protection sheet 4 on the substrate 1 by employing the apparatus shown in FIG. 5–FIG. 7 is now described. First, the center boss 25 is mounted on the shaft 21 of the rotary holder 20, and the substrate 1 of the disk is placed with its recording medium film 3 upside. And by connecting the draft path 24 to a suction pump (not shown in the drawing), the substrate 1 is sucked for fixing it on the rotary holder 20. The center of the substrate 1 is accurately disposed by passing the center boss 25 through the center hole 6. Keeping the drafting, the rotary holder 20 is revolved, and this can be made by utilizing a known motor and rotary coupler (not shown).

Next, a UV-polymerizing adhesive 26 is applied in a circular shape in concentric relation to the axis, and the protection sheet 4 is gently placed on the substrate 1 in such a manner not to produce bubbles in adhesive layer to be produced by spreading of the adhesive 26. By leaving the protection sheet 4 as it is on the substrate, by means of the weight of the protection sheet 4, the adhesive 26 gradually spreads onto all the parts of the substrate without making undesirable bubbles thereon. At this moment, it is possible to appropriately press the protection sheet. In order to select such a condition that the adhesive 26 appropriately spreads to reach inward into the edge of the center hole 6 of the disk 1+4 and outward to a part immediately inside the peripheral edge part, diameter of the circular part of the adhesive application and viscosity of the adhesive should be appropriately selected. From the experimental study, a preferably diameter was found to be shorter than ½ of the diameter of the information storage disk 1+4. In actual example, for instance, for a disk of 200 mm diameter, a circle of about 86 mm diameter for the application part was preferable. If the viscosity of the adhesive is too low, the adhesive will spread too much, and on the contrary, if the viscosity is to high the spreading takes too much time. The experimental study revealed that the preferably range of the viscosity should be selected within a range of 500-3000 cp (25° C.). When the apparatus is left for too long a time in the state shown in FIG. 6, that is, in such a state that the inward spreading front of the adhesive touches the center boss 25, the adhesive 26 further spreads along the surface of the center boss 25 and undesirably creeps into gaps between the edges at the center hole 6 of the substrate 1 and the protection sheet 4 and the surface of the center boss 25, and further to the upper surface of the protection sheet 4 or the lower surface of the substrate 1. Accordingly, the time of revolving the rotary holder 20 with the substrate 1 and the protection sheet 4 and adhesive 26 thereon is also an important factor. But the time is dependent on the application diameter, amount and viscosity of the adhesive; and on the contrary, if the application diameter, application amount and viscosity of the adhesive 26 is controlled to a certain value, by appropriately selecting the time from the placing of the protection sheet 4 on the substrate 1 on the rotary holder 20, an ideal manufacturing of disk 1-4 is possible without insufficient creeping or undesirable excessive creeping of the adhesive to the center hole part of the disk or the further creeping of the adhesive to the surfaces of the substrate 1 and the protection sheet 4.

Then, after coming to the state of FIG. 6, the rotary holder 20 is revolved around its axis, and then the adhesive spreads by centrifugal force to the peripheral edge part 27 of the disk 1, and further the adhesive 26 which overflows from the peripheral edge 27 of the disk 1 flies out as shown by arrow 28, and therefore there is no possibility that the adhesive creeps to the lower face of the substrate 1 or the upper face of the protection sheet 4. The rotation number of the rotary holder at this time is an important factor to obtain a uniform thickness of the adhesive film and appropriate filling of the adhesive on all the part of the substrate. Preferably rotation speed is dependent on the viscosity of the adhesive, and the experimental research reveals that, when using adhesive of a viscosity in a range of 1000 cp-2000 cp (at 25° C.), at a rotation speed of 300-1000 rpm, a preferable uniform adhesive film is obtainable and the adhesive was satisfactorily filled by a rotation time in a range of 30-90 sec without generating and trapping bubbles on the whole area of the disk.

After revolving the disk at the above-mentioned rotation number for the above-mentioned time, a UV-light is irradiated from the upper face of the protection sheet 4 as shown by arrows 29 in FIG. 7, thereby is harden the adhesive, and the bonding is completed in a short time.

If the hardening by the UV irradiation is carried out by keeping the same rotation speed to spread and centrifugally discharging excessive adhesive, there is a possibility that the adhesive becomes hardened in such a manner that the hardened adhesive is shaped irregularly protruding from the peripheral edge part, by centrifugal force. Therefore, in such a case, there is a necessity of edge-grinding of the disk in order to remove the irregular protrusions. Accordingly, the revolution speed during the hardening step should be sufficiently lowered from that of the application and spreading of adhesive. Experimental research shows that the rotation speed for the hardening step is preferably lower than about ⅓ of the rotation speed of adhesive application and spreading, so as to obtain uniform and smooth hardened adhesive layer 26 between the substrate 1 and the protection sheet 4.

As shown in FIG. 7, since the present method does not use pressing of the protection sheet on the substrate in bonding and hardening of the adhesive, such as disk is obtainable as strain in the hardening hardly takes place, and hence curling or distortion of the disk, immediately after the bonding and hardening, or long time after the bonding, do not take place. Furthermore, since the hardening is made by rotating the disk, even if the exposure of the UV-light is uneven, uniform irradiation on the disk is obtainable, hence the possibility of curling or the distortion of the disk is very much reduced.

As mentioned above, by hardening the disk by rotating it at a rotation speed which is sufficiently lower than the rotation speed of centrifugally discharging excessive adhesive from the peripheral edge, the adhesive layer becomes uniformed and smooth and the disk is hardened as it is. But, since the excessive adhesive which comes out of the periferal edge part is hardened as it is sticking on the peripheral part, the overall outside size of the disk sometimes becomes larger than its designed diameter of the substrate and of the overriding protection sheet. Therefore, in order to smoothly enclose in a disk cartridge or the like case, the peripheral part of the disk must be ground, so that the adhesive coming out of the disk is removed to make the peripheral edge as smooth as designed. But such mechanical finishing of the peripheral edge takes time and troublesome manual procedure. Accordingly, the present invention cleans the peripheral edge of the disk very well by automatic processing as hereafter described.

Figure 9:
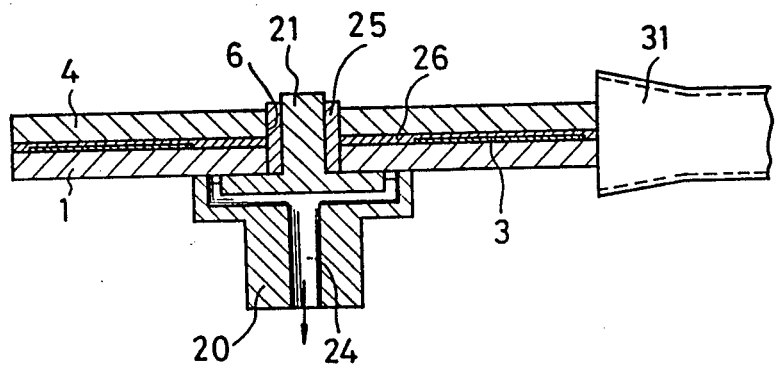
FIG. 9 is a sectional view showing another embodiment of manufacturing information storage disk embodying the present invention.
Figure 10:
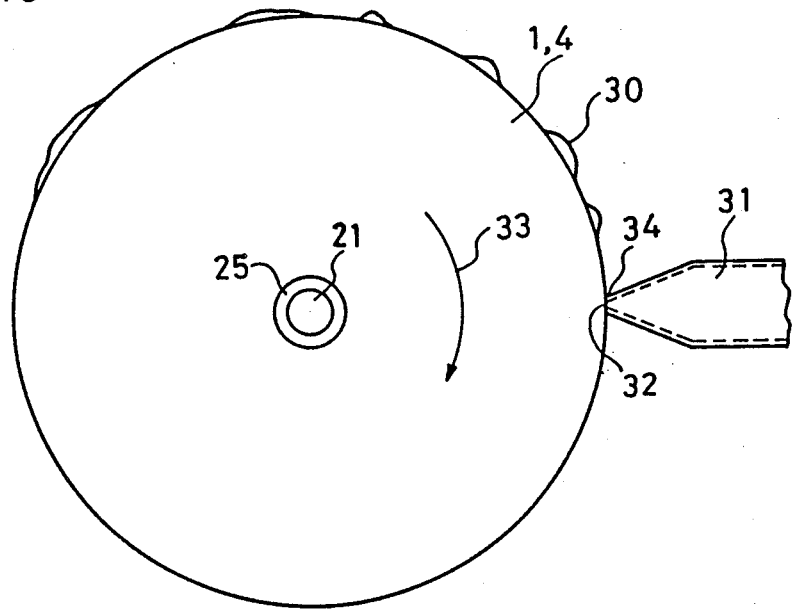
FIG. 10 is a plan view showing operation of the apparatus of FIG. 9.
Figure 11:
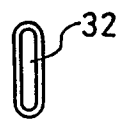
FIG. 11 is a front view of a nozzle part 31 of the apparatus shown in FIG. 9 and FIG. 10.

FIG. 9 is a sectional view of the manufacturing apparatus with the peripheral part finishing device 31. The disk which comprises the substrate 1, the recording medium 3, adhesive 26 and the protection sheet 4 is placed on a rotary holder 20, similarly as the previous examples. The peripheral part finishing device 31 has a sucking nozzle 31, narrowed opening thereof being lightly touching the peripheral edge of the disk as shown in FIG. 9 and FIG. 10. The narrowed opening of the suction pipe 31 has a vertically oblong opening 32 as shown in FIG. 11 and the vertical internal size of the suction pipe opening 32 is designed a little larger than overall thickness of the disk (1,4), and the face of the opening 32 of the sucking nozzle, and the face of the opening of the sucking nozzle 31 is finished flat for good contact to the disk periphery. The sucking nozzle 31 is made of a thin metal pipe, such that the thickness of the suction pipe at the opening part is smaller than the horizontal internal size of the opening. By designing the sucking nozzle 31 in such a manner, moving and creeping of the adhesive towards the surface parts of the disk is prevented.

In case the excessive adhesive pouring out to the peripheral edge part of the disk is sucked by the sucking nozzle 31, when the disk 1+4 is rotating in a direction shown by arrow 33, the excessive adhesive 30 is scraped by the end tip part of the sucking nozzle 31 and the scraped adhesive is sucked in the pipe shaped sucking nozzle 31. In this sucking operation, if the time from the scraping of the adhesive 30 to the sucking into the sucking nozzle 31 is long, there is a possibility of undesirable creeping of the adhesive to the upper or lower surface of the disk. Accordingly the opening 32 of the end tip of the sucking nozzle 31 must be designed to have appropriate area and shape, so as to assure sufficient drafting air speed, and the thickness of the end tip part of the sucking nozzle 31 is designed so as to be as thin as possible. Furthermore, in order to lightly touch the end tip of the sucking device 31 to the peripheral edge of the disk 1+4, for instance, spring means for pushing the end tip of the sucking device 31 is a suitable force is preferably provided.

In case the center boss 25 of FIG. 6 is of theoretical cylindrical shape, if the center hole 6 of the substrate 1 has a diameter slightly deviating from designed value or the shape of the center hole deviates from a theoretical circle to an elliptic shape by some reason, a small gap will be produced between the center boss 25 and the center hole 6 of the disk, and excessive adhesive 26 may creep into the gap. And further, the creeping adhesive may go up to the upper and lower surfaces of the disk or sticks on the rotary holder 20. Moreover, some times, when the disk is completed the creeping adhesive irregularly may stick on the inside wall of the center hole 6 which is to define the center of rotation of the information storage disk in use, and then, as a result of distortion of the center hole shape by such sticking adhesive, accuracy of rotation of the information storage disk is destroyed.

Figure 12:
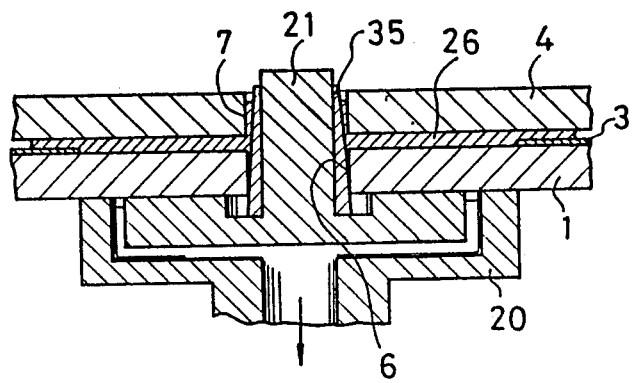
FIG. 12, FIG. 13 and FIG. 14 show sectional views of still another embodiment of the present invention.
Figure 13:
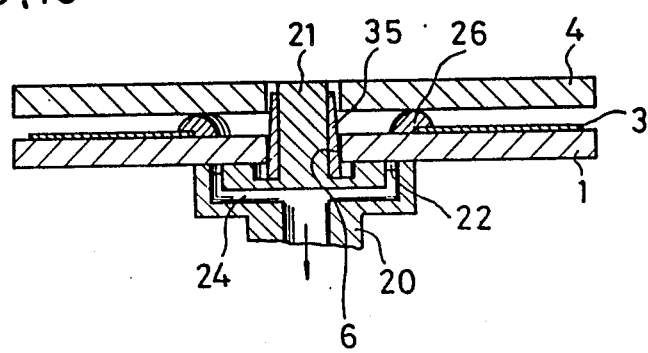

Therefore, aiming for better fitness accuracy of the center hole 6 and the center boss 25, a new devicing has been demanded for. A modified embodiment shown in FIG. 12 through FIG. 14 enables to fulfil the abovementioned demand. As shown in FIG. 12 the center boss 35 is configurated to have a sectional shape of slightly upward narrowing taper, and the center boss 35 is made of a springy substance such as an engineering resin in a relatively thin structure with the slightly tapered shape, and is loosely mounted on the shaft 21. The shape and size of the tapered center boss is designed such that the outer diameter of the upper part of the center boss 35 is selected smaller than the diameter of the center hole 6 of the substrate 1, and the diameter of the bottom of the center boss 35 is selected larger than the diameter of the center hole 6. Therefore, when the substrate 1 is mounted on the rotary holder 20 by inserting the center boss 35 in the center hole 6 of the substrate 1, the center hole 6 is lightly pressed to the center boss 35. Next, manner of bonding the protection sheet 4 on the substrate 1 is described with reference to FIGS. 12 through 14. First, as shown in FIG. 13, center boss 35 is mounted with its smaller diameter side upside on the shaft 21, and the disk 1 is held on the rotary holder 20 by inserting the center boss 35 in the center hole 6 of the substrate 1, which is then fixed by negative pressure of the circular groove 22 connected to a sucking pump (not shown). Since the diameter of the center boss 35 at the position where the disk 1 is fixed is selected to be slightly larger than inner diameter of the center hole of the disk 1, the sucking fixing of the disk makes the slightly forced, hence ideal good fitting of the center hole around the center boss 35. The rotation of the rotary holder 20 to rotate the disk 1 can be made by using known motor and rotary coupler (not shown) through which the suction air can be drafted.

Next, a UV-polymerizing adhesive 26 is applied in a circular shape in co-centrical relation to the axis of the disk, and protection sheet 4 is gently placed on the substrate 1 in such a manner not to produce bubbles in adhesive layer to be produced by spreading of the adhesive 26. By leaving the protection sheet 4 as it is on the substrate, by means of the weight of the protection sheet 4, the adhesive 26 gradually spreads all the part of the substrate without making undesirable bubbles therein. At this moment it is possible to appropriately press the protection sheet. In order to select such a condition that the adhesive 26 appropriately spreads to reach inward into the edge of the center hole 6 of the disk 1-4 and outward to the part immediately inside the peripheral edge part, diameter of the circular part of the adhesive application and viscosity of the adhesive should be appropriately selected. From the experimental study, a preferable diameter was found to be shorter than $\frac{1}{2}$ of the diameter of the information storage disk 1-4. In actual example, for instance, for a disk of 200 mm diameter, a circle of about 86 mm diameter for the application part was preferable. If the viscosity of the adhesive is too low, the adhesive will spread too much and on the contrary, if the viscosity is too high the spreading takes too much time. The experimental study revealed that preferable range of the viscosity should be selected within a range of 500-3000 cp (25° C.). When the apparatus is left for too long time in the state shown in FIG. 12, that, in such a state inward spreading front of the adhesive touches the center boss 35, the adhesive 26 further spreads along the surface of the center boss 35 and undesirable creeps into gaps between the edges at the center hole 6 of the substrate 1 and the protection sheet 4 and the surface of the center boss 35, and further to the upper surface of the protection sheet 4 or the lower surface of the substrate 1. Accordingly, the time of revolving the rotary holder 20 with the substrate 1 and the protection sheet 4 and adhesive 26 thereon is also an important factor. But the time is dependent on the application diameter amount and viscosity of the adhesive; and on the contrary if the application diameter, application amount and viscosity of the adhesive 26 is controlled to a certain value, by appropriately selecting time from the placing of the protection sheet 4 on the substrate 1 on the rotary holder 20, an ideal manufacturing of disk 1-4 is possible without insufficient creeping or undesirable excessive creeping of adhesive to the center hole part of the disk or the further creeping of the adhesive to the surface of the substrate 1 and the protection sheet 4. In this rotation time, possibility of arising of gap between the edge of the center hole 7 and the center boss 35 can be minimized by designing the diameter of the center hole to the slightly smaller than the diameter at the level of the center boss 35. Therefore by appropriately selecting the degree of tapering of the center boss 35, possibility of arising of the gap is minimized and that the placing of the substrate 1 and the protection film 4 on the rotary holder can be made yet easy.

Figure 14:
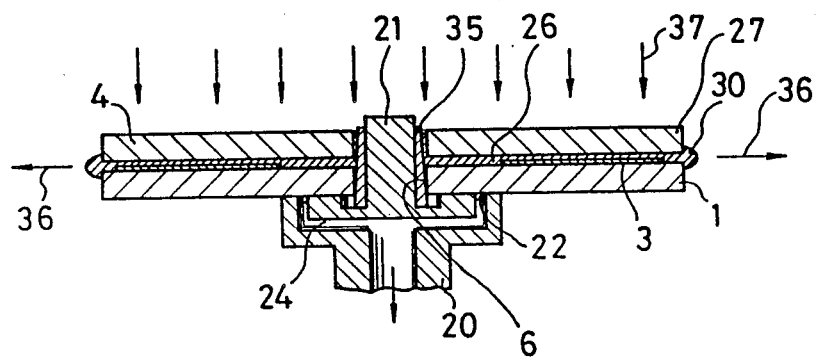

Then after becoming to the state of FIG. 14, the rotary holder 20 is revolved around its axis, and then the adhesive spreads by centrifugal force to the peripheral edge part 27 of the disk 1, and further the adhesive 26 which overflowed from the peripheral edge 27 of the disk 1 flies out as shown by arrow 36, and therefore there is no possibility that the adhesive creeps to the lower face of the substrate 1 or the upper face of the protection sheet 4. The rotation number of the rotary holder at this time is an important factor to obtain a uniform thickness of the adhesive film and appropriate filing of the adhesive on all the part of the substrate. Preferable rotation speed is dependent on the viscosity of the adhesive, and experimental research reveals that when using adhesive of a viscosity in a range of 1000 cp-2000 cp (at 25° C.), at a rotation speed of 300-1000 rpm, a preferable uniform adhesive film is obtainable and the adhesive wall satisfactorily filled by a rotation time in a range of 30-90 sec without generating and trapping bubbles on the whole of the disk.

After revolving the disk at the above-mentioned rotation number for the above-mentioned time, a UV-light is irradiated from the upper face of the protection sheet as shown by arrows 37 in FIG. 14, thereby to harden the adhesive, and the bonding is completed in a short time.

Figure 15:
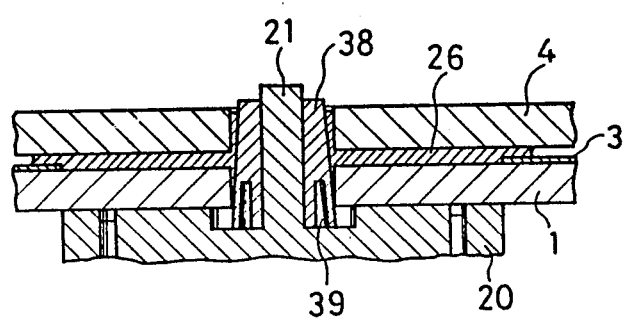
FIG. 15 and FIG. 16 are sectional views of still another embodiment.

FIG. 15 shows still another example, wherein the center boss 38 is configurated in a tapered shape like that of FIG. 12, but a circular hollow 39 is provided opening to the bottom face, namely the larger diameter end, so that the center boss 38 has a resilient characteristic. Therefore a good fitting between the outer face of the center boss 38 and the edge part of the center hole is obtainable.

Figure 16:
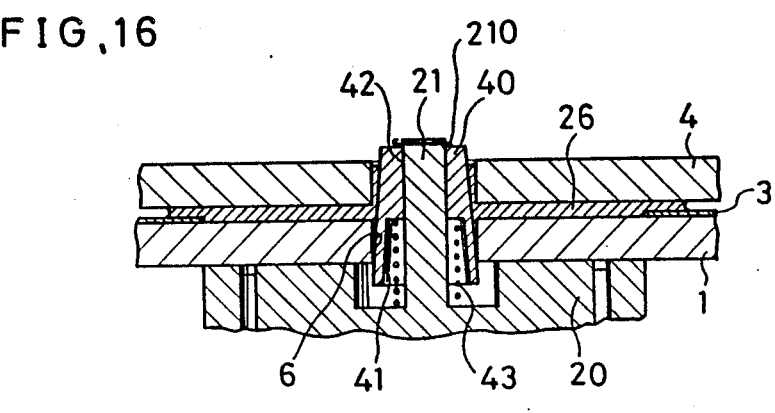

FIG. 16 shows still another embodiment, wherein the center boss 40 is slidable on the shaft 21 at the mounting face 42 and has a hollow part 41 open to the bottom, namely the outer diameter end, and a coil spring is provided therein to push the center boss 40 upward. A stopper pin 210 is provided at the stop part of the shaft 21 so as to stop the center boss 40 from dropping off. Since the coil spring 43 is provided to push up the tapered center boss 40, fitting between the center hole edge 6 of the substrate 1 and the center boss 40 is complete.

As the material of the center boss 35, 38 or 40, a high polymer plastics which has a characteristic of being hardly adherable by an adhesive is appropriate. For instance, a fluorine-containing polymer is usable. The center boss may have a cone-shaped, truncated cone-shaped top part or round-shaped top part for an easy placing of the disk 1 and the protection sheet 4.

As a result of the above-mentioned utilization of centrifugal spreading of the adhesive applied between the laminated substrate and the overriding protection sheet, the forming of the adhesive film between the substrate and the protection sheet is very smooth and uniform and done without inclusion of undesirable bubbles. Furthermore, by using the centrifugal spreading together with a drafted scraper, no undesirable creeping of the excessive adhesive onto the surfaces of the substrate and the protection sheet takes place. And furthermore, by utilizing the UV hardening adhesive and UV exposure after slowing down the rotation speed from the centrifugal spreading process, the hitherto required finishing up by grinding of the disk edge can be dispensed with, and the bonding can be made in a short time.

By adoption of the tapered center boss and or if resilient plastic center boss is used, even though the size and/or shape of the center hole deviates from designed values, hitherto-common irregular sticking of pouring out excessive adhesive around the center hole part of the disk is eliminated, and hence no after-bond-finishing work is necessary.

What is claimed is:

1. A method for making information storage disk, comprising the steps of:
    applying viscose adhesive on a first disk having a center hole, at a part near said center hole,
    placing a second disk having a center hole corresponding to said center hole of said first disk on said first disk, to form an assembled disk, in which a face of said first disk confronts a face of said second disk,
    temporarily mounting said assembled disk on rotating means, temporarily inserting a center boss of said rotating means in both said center holes,
    while releasably holding only said first disk, revolving said assembled disk around an axis of said center boss by said rotating means to spread said viscose adhesive to all parts of said confronting faces, and
    revolving said assembled disk around said axis of said center boss by said rotating means, while hardening said adhesive while maintaining said assembled disk temporarily mounted on said center boss.

2. A method in accordance with claim 1 wherein speed of revolving of said assembled disk in said hardening is lower than that in said revolving to spread said viscose adhesive.

3. A method in accordance with claim 1, wherein said viscose adhesive is a UV-hardening adhesive.

4. A method in accordance with claim 1, wherein after slowing down speed of revolving of said assembled disk upon completion of said spreading, excessive amount of adhesive coming out at peripheral edge part of said assembled disk is scraped by touching a sucking nozzle to said peripheral edge part said sucking nozzle being connected to suction means.

5. A method in accordance with claim 4, wherein said sucking nozzle has substantially flat opening to touch said peripheral edge part, made in vertically oblong oval or rectangle shape with a pipe of thin sheet.

6. A method in accordance with claim 1, wherein said center boss has a resiliency, said first disk is mounted by lightly pressing to said center boss and said second disk is mounted by loosely fitting said center boss.

7. A method in accordance with claim 1, wherein said center boss has an upward-narrowing taper, and said first disk is mounted on said center boss by pressing said first disk onto center boss.

8. A method in accordance with claim 6, wherein said center boss has an upward-narrowing taper, and said first disk is mounted on said center boss by pressing said first disk onto said center boss.

* * * * *